(12) United States Patent
Darden

(10) Patent No.: US 10,596,962 B1
(45) Date of Patent: Mar. 24, 2020

(54) AUTOMOTIVE CHANDELIER ASSEMBLY

(71) Applicant: Nelson Darden, Hephzibah, GA (US)

(72) Inventor: Nelson Darden, Hephzibah, GA (US)

(*) Notice: Subject to any disclaimer, the term of this patent is extended or adjusted under 35 U.S.C. 154(b) by 0 days.

(21) Appl. No.: 16/253,386

(22) Filed: Jan. 22, 2019

(51) Int. Cl.
| | | |
|---|---|---|
| *B60Q 3/74* | (2017.01) | |
| *F21V 15/02* | (2006.01) | |
| *F21S 8/06* | (2006.01) | |
| *F21V 5/06* | (2006.01) | |

(52) U.S. Cl.
CPC .......... *B60Q 3/74* (2017.02); *F21S 8/065* (2013.01); *F21V 5/06* (2013.01); *F21V 15/02* (2013.01); *B60Q 2500/00* (2013.01); *B60Q 2900/10* (2013.01)

(58) Field of Classification Search
None
See application file for complete search history.

(56) References Cited

U.S. PATENT DOCUMENTS

| | | | |
|---|---|---|---|
| 3,531,636 A | 9/1970 | Birch | |
| D301,628 S | 6/1989 | Fuller | |
| 5,906,430 A * | 5/1999 | Bayer | F21V 5/06 362/404 |
| 6,264,344 B1 | 7/2001 | Quiogue | |
| 7,581,858 B1 | 9/2009 | Gallegos | |
| 7,993,042 B2 | 8/2011 | Padilla | |
| D683,896 S | 6/2013 | Yando | |
| 2006/0092650 A1 | 5/2006 | Firneisz | |
| 2014/0268698 A1* | 9/2014 | Zimmerman | F21V 13/08 362/183 |

* cited by examiner

*Primary Examiner* — Britt D Hanley

(57) ABSTRACT

An automotive chandelier assembly includes a cage that has a plurality of openings extending therethrough. Thus, the cage has a grid-like structure to pass light therethrough and the cage is positionable to replace a dome light cover in a vehicle. A plurality of refractors is provided and each of the refractors is positioned within a respective one of the openings in the cage. Each of the refractors refracts light passing through the respective opening to produce a chandelier effect when the dome light is turned on. A plurality of ornaments is provided and each of the ornaments is suspended from housing. Each of the ornaments is comprised of a light refracting material to produce a chandelier effect when the dome light is turned on.

8 Claims, 4 Drawing Sheets

AUTOMOTIVE CHANDELIER ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to chandelier devices and more particularly pertains to a new chandelier device for producing a chandelier effect with a dome light in a vehicle.

BRIEF SUMMARY OF THE INVENTION

An embodiment of the disclosure meets the needs presented above by generally comprising a cage that has a plurality of openings extending therethrough. Thus, the cage has a grid-like structure to pass light therethrough and the cage is positionable to replace a dome light cover in a vehicle. A plurality of refractors is provided and each of the refractors is positioned within a respective one of the openings in the cage. Each of the refractors refracts light passing through the respective opening to produce a chandelier effect when the dome light is turned on. A plurality of ornaments is provided and each of the ornaments is suspended from housing. Each of the ornaments is comprised of a light refracting material to produce a chandelier effect when the dome light is turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
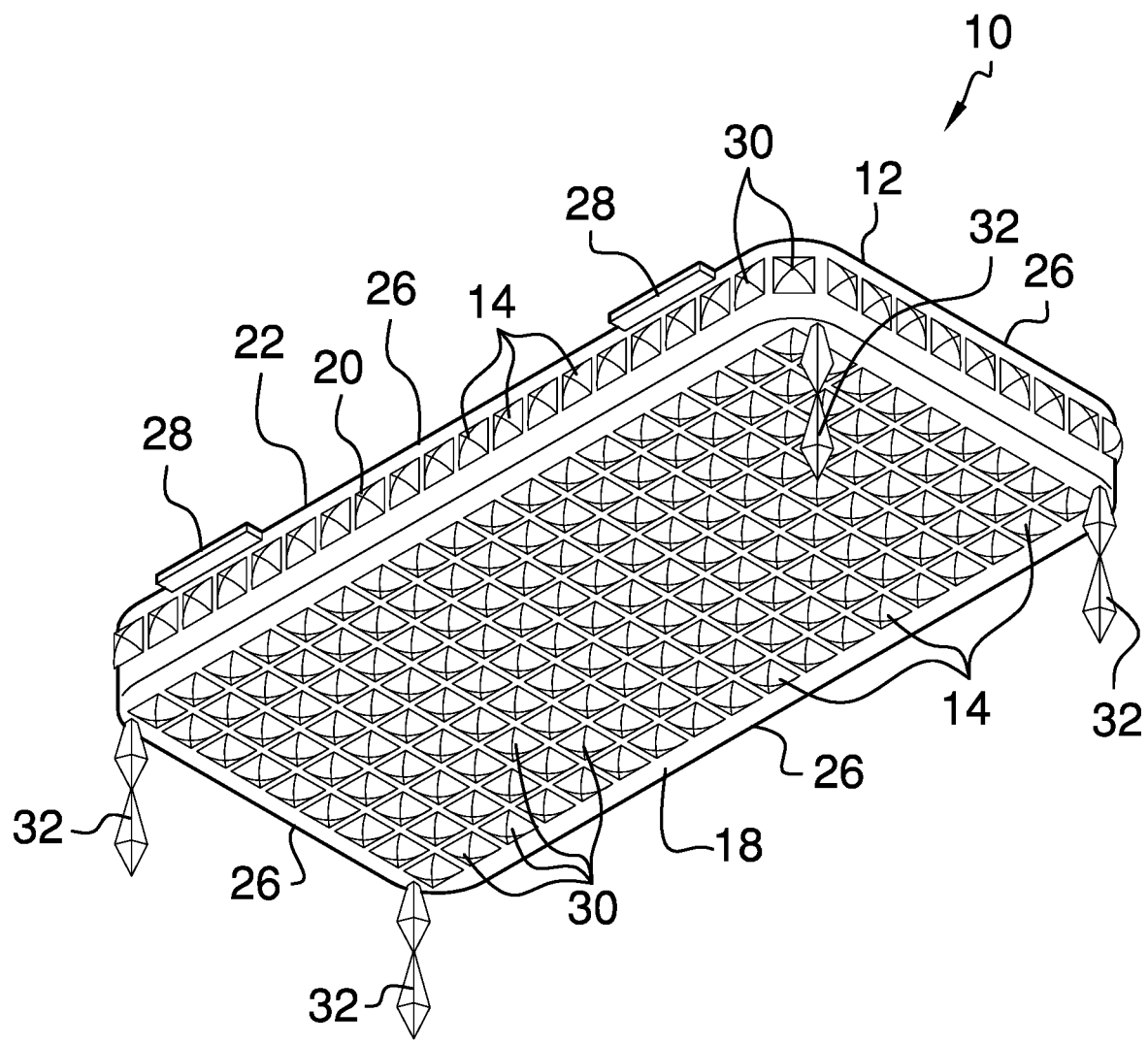
FIG. 1 is a bottom perspective view of an automotive chandelier assembly according to an embodiment of the disclosure.
Figure 2:
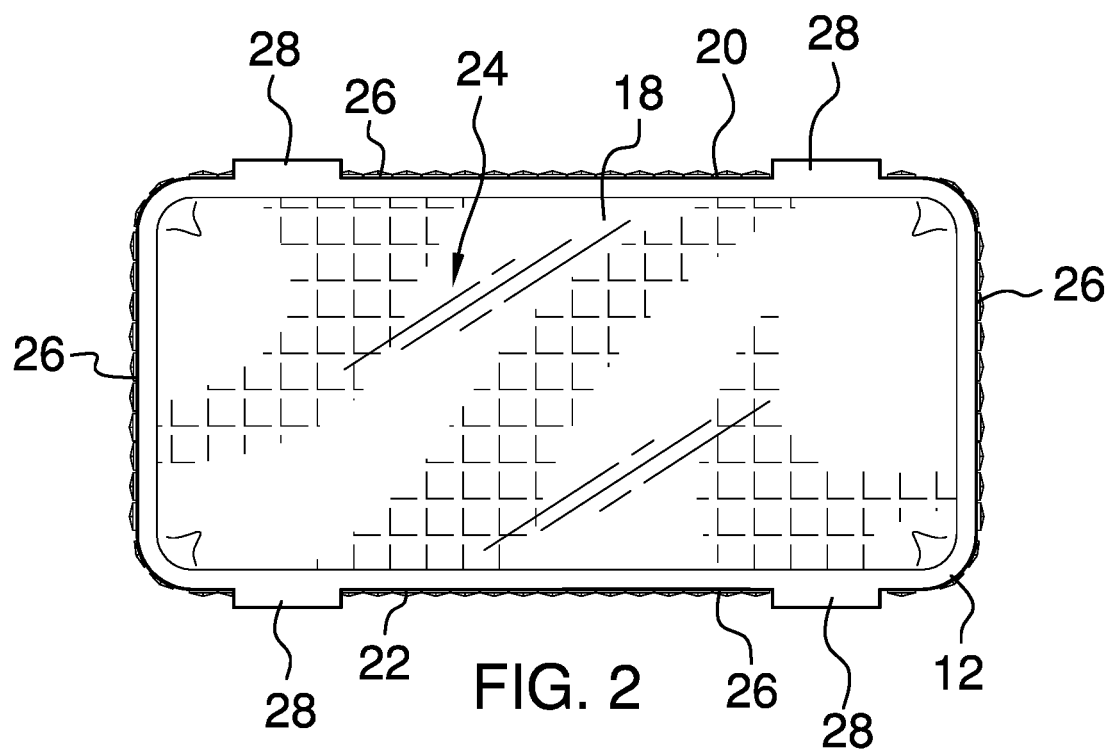
FIG. 2 is a top view of an embodiment of the disclosure.
Figure 3:
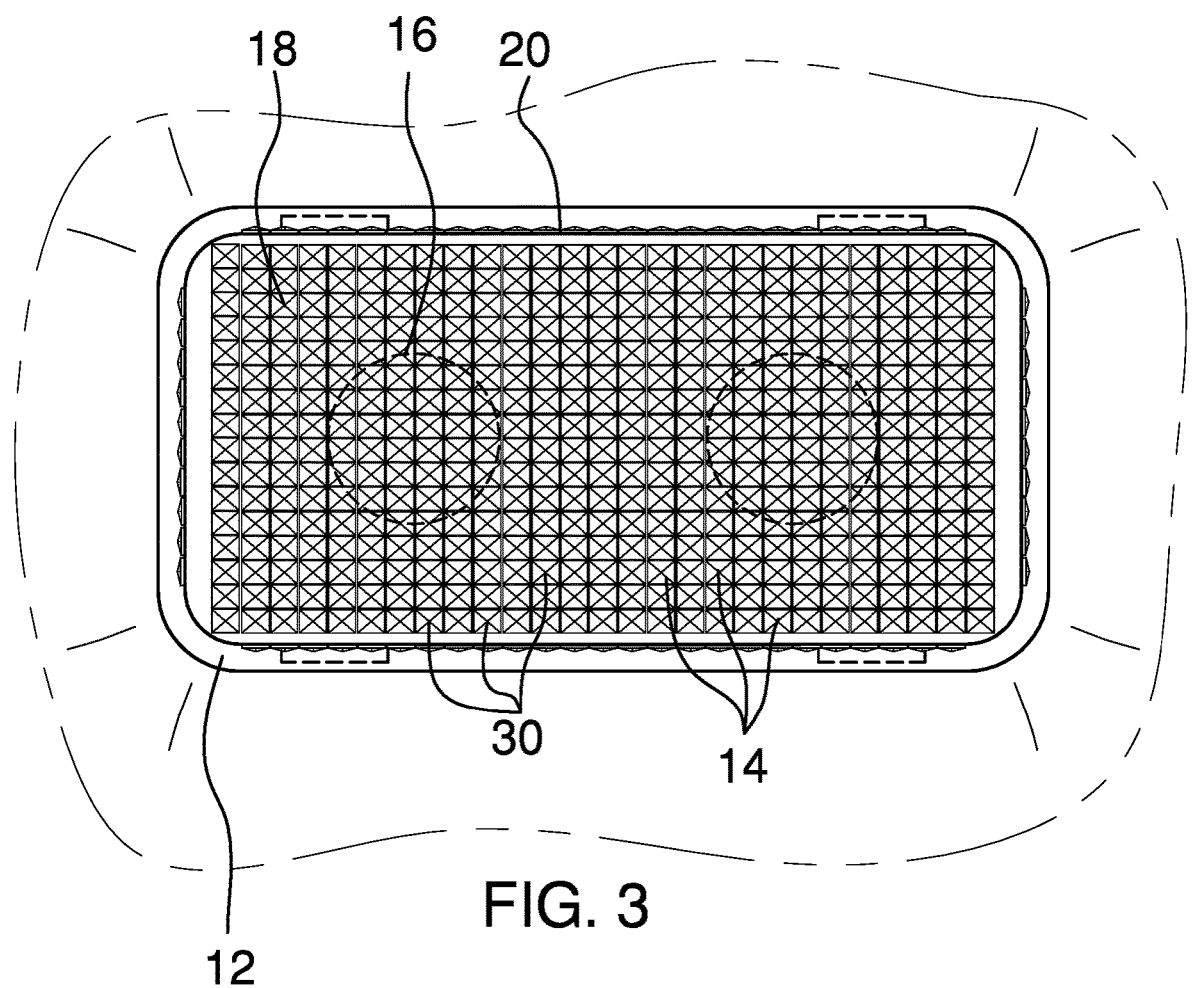
FIG. 3 is a perspective in-use view of an embodiment of the disclosure.
Figure 4:
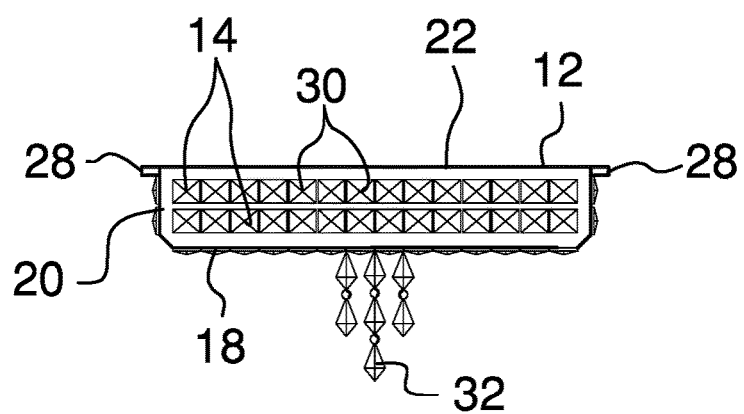
FIG. 4 is a right side view of an embodiment of the disclosure.

With reference now to the drawings, and in particular to FIGS. 1 through 5 thereof, a new chandelier device embodying the principles and concepts of an embodiment of the disclosure and generally designated by the reference numeral 10 will be described.

As best illustrated in FIGS. 1 through 5, the nameinvent 10 generally comprises a cage 12 that has a plurality of openings 14 extending therethrough such that the cage 12 has a grid-like structure. Thus, the cage 12 passes enlight therethrough. The cage 12 has a height of approximately 3.0 inches, a width of approximately 6.0 inches and a depth of approximately 3.0 inches. In this way the cage 12 is sufficiently sized to surround a dome light 16 in a vehicle. The cage 12 has a bottom wall 18 and an outer wall 20 extending upwardly therefrom. The outer wall 20 has a distal edge 22 with respect to the bottom wall 18 defining an opening 24 into the cage 12. The outer wall 20 has a plurality of intersecting sides 26 such that the outer wall 20 defines a rectangular shape, and the openings 14 extend through each of the bottom 18 and outer 20 walls.

A plurality of engagements 28 is each coupled to the cage 12 and engages the dome light 16 to retain the cage 12 around the dome light 16. Each of the engagements 28 extends outwardly from the outer wall 20 of the cage 12 and each of the engagements 28 is aligned with the distal edge 22 of the outer wall 20. The engagements 28 are spaced apart from each other and is distributed around the outer wall 20. Each of the engagements 28 may comprise tabs the engage a lens of the dome light 16 or other non-penetrating engagement.

A plurality of refractors 30 is each positioned within a respective one of the openings 14 in the cage 12. Each of the refractors 30 refracts light passing through the respective opening to produce a chandelier effect when the dome light 16 is turned on. Each of the refractors 30 may be prisms of any shape that generally correspond to prisms used on chandeliers. A plurality of ornaments 32 is each suspended from housing. Each of the ornaments 32 is comprised of a light refracting material to produce a chandelier effect when the dome light 16 is turned on. Each of the ornaments 32 may comprise a sequence of prisms of any shape such as are commonly found on chandeliers.

Figure 5:
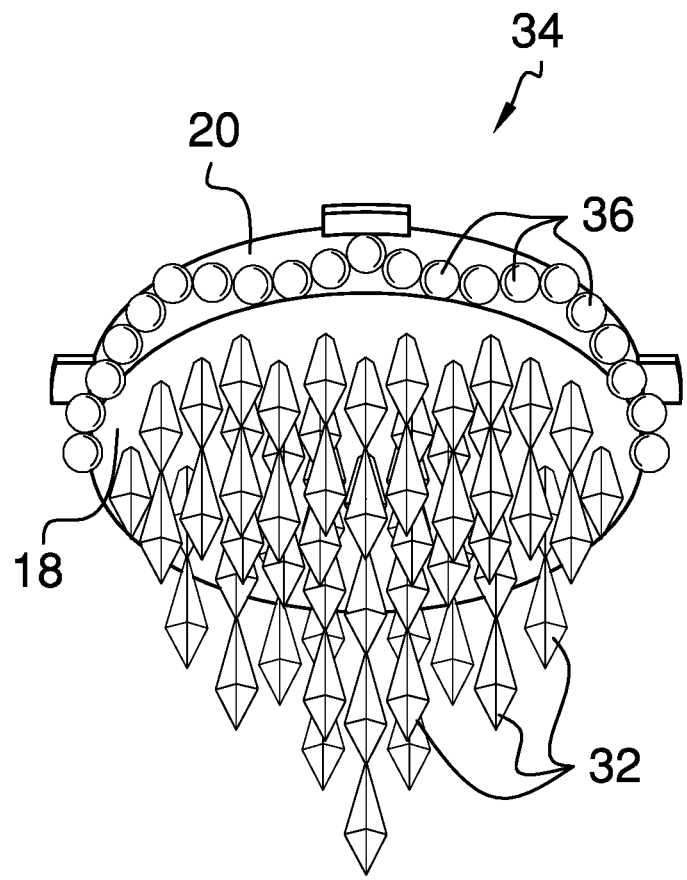
FIG. 5 is a perspective view of an alternative embodiment of the disclosure.

In an alternative embodiment 34 as shown in FIG. 5, each of the bottom 18 and outer 20 walls is comprised of a solid panel and the outer wall 20 is continuously arcuate such that the outer wall 20 defines a circle. Each of the bottom 18 and outer 20 walls is comprised of a translucent material to pass light therethrough when the dome light 16 is turned on. Continuing in the alternative embodiment 34, a plurality of elements 36 is each coupled to the outer wall 20 and the elements 36 are coupled together to form a string extending around an entire perimeter of the outer wall 20. As shown in the alternative embodiment 34, each of the ornaments 32 is suspended from the bottom wall 18 and the plurality of ornaments 32 has a variety of lengths. Moreover, the ornaments 32 are arranged such that the length of the ornaments 32 decreases from a center of the bottom wall 18 outwardly toward the outer wall 20.

In use, the cage 12 is positioned around the dome light 16 in the vehicle in order to visually enhance the appearance of the dome light 16. Additionally, each of the refractors 30 and the ornaments 32 refracts light emitted by the dome light 16 when the dome light 16 is turned on. In this way the refractors 30 produce a pleasing visual effect in the vehicle when the dome light 16 is turned on. The cage 12 can be removed from the dome light 16 at any time for cleaning or servicing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automotive chandelier assembly being configured to be mounted on a dome light in a vehicle for enhancing the ornamental appearance of the dome light, said assembly comprising:
   a cage having a plurality of openings extending therethrough such that said cage has a grid-like structure wherein said cage is configured to pass light therethrough, said cage having a height of approximately 3.0 inches, a width of approximately 6.0 inches and a depth of approximately 3.0 inches wherein said cage is configured to replace a dome light cover in a vehicle;
   a plurality of refractors, each of said refractors being positioned within a respective one of said openings in said cage, each of said refractors refracting light passing through said respective opening; and
   a plurality of ornaments, each of said ornaments being suspended from housing, each of said ornaments being comprised of a light refracting material.

2. The assembly according to claim 1, wherein said cage has a bottom wall and an outer wall extending upwardly therefrom, said outer wall having a distal edge with respect to said bottom wall defining an opening into said cage, said outer wall having a plurality of intersecting sides such that said outer wall defines a rectangular shape, said openings extending through each of said bottom and outer walls.

3. An automotive chandelier assembly being configured to be mounted on a dome light in a vehicle for enhancing the ornamental appearance of the dome light, said assembly comprising:
   a cage having a plurality of openings extending therethrough such that said cage has a grid-like structure wherein said cage is configured to pass light therethrough, said cage having a height of approximately 3.0 inches, a width of approximately 6.0 inches and a depth of approximately 3.0 inches wherein said cage is configured to replace a dome light cover in a vehicle, said cage having a bottom wall and an outer wall extending upwardly therefrom, said outer wall having a distal edge with respect to said bottom wall defining an opening into said cage, said outer wall having a plurality of intersecting sides such that said outer wall defines a rectangular shape, said openings extending through each of said bottom and outer walls;
   a plurality of refractors, each of said refractors being positioned within a respective one of said openings in said cage, each of said refractors refracting light passing through said respective opening; and
   a plurality of ornaments, each of said ornaments being suspended from housing, each of said ornaments being comprised of a light refracting material.

4. The assembly according to claim 3, further comprising a plurality of engagements, each of said engagements being coupled to said cage and engaging the dome light wherein said engagements are configured to retain said cage around the dome light, each of said engagements extending outwardly from said outer wall of said cage, each of said engagements being aligned with said distal edge of said outer wall, said engagements being spaced apart from each other and being distributed around said outer wall.

5. An automotive chandelier assembly being configured to be mounted on a dome light in a vehicle for enhancing the ornamental appearance of the dome light, said assembly comprising:
   a cage having a plurality of openings extending therethrough such that said cage has a grid-like structure wherein said cage is configured to pass light therethrough, said cage having a height of approximately 3.0 inches, a width of approximately 6.0 inches and a depth of approximately 3.0 inches wherein said cage is configured to replace a dome light cover in a vehicle, said cage having a bottom wall and an outer wall extending upwardly therefrom, said outer wall having a distal edge with respect to said bottom wall defining an opening into said cage, said outer wall having a plurality of intersecting sides such that said outer wall defines a rectangular shape, said openings extending through each of said bottom and outer walls;
   a plurality of engagements, each of said engagements being coupled to said cage and engaging the dome light wherein said engagements are configured to retain said cage around the dome light, each of said engagements extending outwardly from said outer wall of said cage, each of said engagements being aligned with said distal edge of said outer wall, said engagements being spaced apart from each other and being distributed around said outer wall;
   a plurality of refractors, each of said refractors being positioned within a respective one of said openings in said cage, each of said refractors refracting light passing through said respective opening; and a plurality of ornaments, each of said ornaments being suspended from housing, each of said ornaments being comprised of a light refracting material.

6. The assembly according to claim 5, wherein each of said bottom and outer walls is comprised of a solid panel, said outer wall being continuously arcuate such that said outer wall defines a circle, each of said bottom and outer walls being comprised of a translucent material wherein each of said bottom and outer walls is configured to pass light therethrough when the dome light is turned on.

7. The assembly according to claim 6, further comprising a plurality of elements, each of said elements being coupled to said outer wall, said elements being coupled together to form a string extending around an entire perimeter of said outer wall.

8. The assembly according to claim 7, each of said ornaments is suspended from said bottom wall, said plurality of ornaments having a variety of lengths, said ornaments being arranged such that the length of said ornaments decreases from a center of said bottom wall outwardly toward said outer wall.

\* \* \* \* \*